June 20, 1961  R. H. LAMASON  2,989,419
IMPROVING THE ADHESIVE BOND AND DELAMINATION RESISTANCE
OF FLUOROCARBON BACKED ADHESIVE TAPE
Filed May 14, 1957
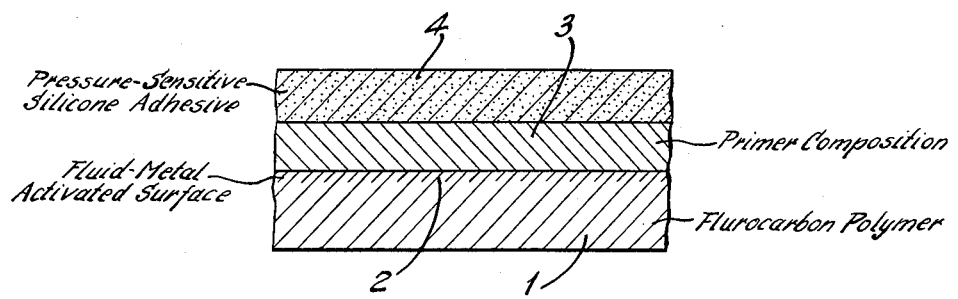
INVENTOR
ROBERT H. LAMASON
BY
Harold Haidt
ATTORNEY

United States Patent Office 2,989,419
Patented June 20, 1961

2,989,419
IMPROVING THE ADHESIVE BOND AND DELAMINATION RESISTANCE OF FLUOROCARBON BACKED ADHESIVE TAPE
Robert H. Lamason, Bound Brook, N.J., assignor, by mesne assignments, to Johnson & Johnson, New Brunswick, N.J., a corporation of New Jersey
Filed May 14, 1957, Ser. No. 659,000
10 Claims. (Cl. 117—71)

This invention relates to adhesive coated sheets and more particularly to flexible adhesive coated sheets having a backing element comprising a fluorocarbon polymer and an adhesive coating comprising a normally tacky and pressure-sensitive silicone adhesive. Still more specifically, this invention relates to an adhesive sheet or tape having a surface-activated fluorocarbon backing element and a normally tacky and pressure-sensitive silicone adhesive in which said adhesive is more firmly bonded to said backing element and said tape is capable of being wound upon itself in roll form and unwound therefrom without delamination of the tape or offsetting of the adhesive.

The term "fluorocarbon polymer" as used herein and in the appended claims is intended to refer to and include substantially inert and highly stable fluorine containing polymers including polyfluoro-olefins such as polytetrafluoroethylene and polychlorotrifluoroethylene, 1,1-dihydroperfluoroalkyl acrylates such as 1,1-dihydroheptafluorobutyl acrylate, and polyfluoro-vinyl esters. Such fluorocarbon polymers are extremely resistant to corrosive chemicals and solvents and possess the ability to withstand both high and low temperatures without embrittlement or other deleterious effects. On the other hand, the fluorocarbon polymers, normally, have little receptivity to adhesive compositions. Efforts have been made in the past to improve the affinity, anchorage, or adherence of adhesive compositions to fluorocarbon polymers, since the mechanical, chemical and thermal stability of such polymers make them particularly desirable and advantageous for use as adhesive sheet or tape backing elements for many purposes. However, such efforts have not been completely satisfactory.

In addition, normally tacky and pressure-sensitive silicone adhesives because of their chemical and thermal stability and electrical properties have found industrial application in many instances where such properties are important. One major disadvantage of such pressure-sensitive silicone adhesives is their relatively poor adherence to many backing materials. Thus, it is seen that it has been extremely difficult to prepare an adhesive sheet or tape comprising a fluorocarbon polymer backing material, which normally has a relatively poor affinity for adhesives, and a pressure-sensitive silicone adhesive mass, which normally has a relatively poor adherence to backing materials.

It is an object of this invention to provide an adhesive sheet or tape in which a fluorocarbon polymer backing material is more firmly bonded to a pressure-sensitive silicone adhesive. A further object of this invention is to provide an adhesive sheet comprising a fluorocarbon polymer and a pressure-sensitive silicone adhesive which can be wound in tape form and then unwound without substantial offset of the adhesive and delamination of the sheet. Another object is the provision of a primer composition which is suitable for improving the adherence or anchorage of pressure-sensitive silicone adhesive compositions to fluorocarbon polymer backing materials. Still another object of this invention is the provision of a pressure-sensitive adhesive sheet or tape having excellent chemical, mechanical and thermal stability, and which possesses good electrical properties. Other objects will, in part, appear herein, and, in part, be obvious from the following detailed description.

In accordance with this invention, the foregoing objects and others may be obtained by applying a primer composition comprising a tetraalkyl ortho-silicate or a tetraalkyl ortho-titanate and a pressure-sensitive silicone adhesive to at least one major surface of a fluorocarbon polymer backing material which has been treated with a fluid form of a metal and then applying a pressure-sensitive silicone adhesive on said primed surface. The resulting adhesive sheet or tape is one in which the silicone pressure-sensitive mass is securely bonded to the fluorocarbon polymer backing and which may be wound in roll form and then unwound without delamination of the backing or substantial offsetting of the adhesive.

The tetraalkyl ortho-silicate or tetraalkyl orthotitanate useful as an essential component of the primer composition of this invention may be represented by the structural formula $M(OR)_4$ wherein R is an alkyl or hydroxy-substituted alkyl group, either branched or straight chain, containing from about one to twelve carbon atoms; preferably containing from about two to eight carbon atoms and wherein M represents silicon or titanium. Suitable tetraalkyl ortho-silicates and tetraalkyl ortho-titanates include tetramethyl ortho-silicate, tetrabutyl ortho-titanate, tetra (2-ethyl hexyl) orthotitanate, tetradodecyl ortho-titanate, tetradodecyl ortho-silicate, tetraisopropyl ortho-silicate, tetraisopropyl ortho-titanate, octylene glycol titanate and any mixtures thereof. Mixed tetraalkyl ortho-silicates or titanates may likewise be used, e.g., monobutyl-trimethyl ortho-titanate.

The pressure-sensitive silicone adhesive component of the primer composition and the external adhesive mass composition of this invention may be any of the conventional pressure-sensitive silicone adhesive materials, and/or organopolysiloxane containing adhesives. Such materials are known in the art and are described in the patent and other literature. Suitable pressure-sensitive silicone adhesive compositions include those described in United States Letters Patent Numbers 2,736,721 and 2,460,795. A preferred pressure-sensitive silicone adhesive composition is one manufactured and sold by the Dow Corning Corporation under the trade-name "Dow Corning XC-271" and is believed to be a composition containing an alkyl polysiloxane. The pressure-sensitive silicone composition used in the primer composition may be the same as or different from the pressure-sensitive silicone composition used in the external adhesive mass.

The primer composition, thus, comprises a tetraalkyl ortho-silicate or a tetraalkyl ortho-titanate and a pressure-sensitive silicone adhesive. It should be understood that the proportions of the ingredients may vary over a wire range and the precise amounts required will depend upon a number of factors including the particular silicate, titanate or pressure-sensitive silicone adhesive employed and the anchorage or properties desired. When a tetraalkyl ortho-silicate is employed it is preferably used in proportions of from about 20 to 90 percent by weight (dry) of the primer composition, and when a tetraalkyl ortho-titanate is employed it is preferably used in proportions of from about 10 to 90 percent by weight (dry) of the primer composition.

Various modifying agents may be added to either the primer composition or the external pressure-sensitive silicone adhesive mass, or both, to impart particular characteristics or improve their properties. For example, catalysts or curing agents may be added to accelerate the cure of the silicone material and improve adhesivity. Suitable curing agents or catalysts include, for example, the polyalkylene polyamines described in the copending application of Charles Bartell, Serial Number 442,208, filed July 8, 1954, such as tetraethylene pentamine, triethylene tetramine, diethylene triamine and the like; metal salts of carboxylic acids such as zinc octoate and the like; metal alcoholates such as aluminum alcoholate and the like. Fillers and reinforcing pigments such as titanium dioxide, zinc oxide, carbon black, silica, etc. may likewise be added to these compositions.

The primer composition and the adhesive mass are usually dispersed in a solvent such as an aromatic hydrocarbon, e.g., toluene or xylene, or other suitable vehicle to obtain a mixture of proper coating viscosity and may be applied to the fluorocarbon polymer backing material by any of the conventional methods, such as direct and reverse roll, rubber roll and knife, knife and rubber blanket, or calendering. The volatile vehicle for the primer or adhesive composition is usually removed after each coating operation, as by drying. The primer composition is usually applied to the backing in amounts of at least about 0.05 ounce, dry weight, per square yard of backing material, and preferably in amounts of from about 0.1 to 0.3 ounce per square yard of backing material. The pressure-sensitive organopolysiloxane adhesive is applied to the primed surface of the fluorocarbon polymer backing in amounts of from about 1 to 3 ounces (dry weight) per yard of said backing. In addition, it has been found advantageous to cure both the primer composition and the adhesive mass composition after each has been applied to insolubilize the primer coating and prevent its admixture with the subsequently solvent applied adhesive mass, and to otherwise improve the tack and adhesivity of the adhesive mass. The curing may be effected by heating at elevated temperatures. The temperatures employed will depend to some extent upon the time in which the composition is permitted to cure, but, generally, temperatures of from about 200° F. to 575° F. are suitable. A preferred curing cycle is two minutes at 350° F., however, lower temperatures may be used if longer curing times are permitted.

It has also been found that the primer composition should be applied to a surface of a fluorocarbon polymer material which has been treated with a fluid form of an alkali or alkaline earth metal, manganese or zinc to improve the affinity of said surface to an adhesive composition. The term "fluid form of a metal" as used herein and in the appended claims is intended to refer to and include metal vapors as well as liquid solutions or dispersions of such metals. The methods by which fluorocarbon polymers may be treated with a fluid form of a metal to activate their surface are more fully described in British Patent 765,284. A preferred surface activation treatment comprises dipping a polytetrafluoroethylene film into a dilute solution of sodium metal in liquid ammonia, removing the film and briefly heating it to 220° C. As shown by the results recorded in the table below, the primer composition of this invention appears to be selective in its action and seems to be specific for improving anchorage between a pressure-sensitive silicone adhesive, and a fluid-metal treated fluorocarbon polymer surface. It should be understood that the fluid-metal treated fluorocarbon polymer may represent the sole backing material in the tape construction or may comprise one of a plurality of laminae, or may be a composite in which both surfaces of the fluorocarbon polymer film are primed and coated with a pressure-sensitive silicone adhesive. The film may be of any convenient thickness, for example, film thicknesses of about 1–90 mils are satisfactory.

The following examples are illustrative of the preparation of the normally tacky and pressure-sensitive adhesive sheets or tapes in which the novel primer composition of this invention is used to improve the anchorage of a pressure-sensitive silicone adhesive to a metal-treated fluorocarbon polymer backing material and permit the unwinding of said tape when wound in roll form without substantial offset of the adhesive. The examples will further serve to describe the invention.

EXAMPLE 1

In accordance with a preferred embodiment of the invention, a 5 mil film of skived "Teflon" polytetrafluoroethylene, which had been surface treated with sodium metal in liquid ammonia, was knife coated on the surface treated side to a dry coating weight of about 0.15 ounce per square yard using a primer composition comprising:

| | Parts by weight |
|---|---|
| Alkyl polysiloxane pressure-sensitive adhesive (Dow Corning XC–271) | 11.16 |
| Tetraethylene pentamine | 0.04 |
| Tetraethyl ortho-silicate | 11.16 |
| Xylene solvent | 20.0 |

The primer coat was dried at 200° F. to remove the xylene solvent, and then cured for two minutes at 350° F. After curing, the following pressure-sensitive silicone adhesive composition was applied by knife coating onto the primed surface to a dry coating weight of 1.5 ounces per square yard.

| | Parts by weight |
|---|---|
| Alkyl polysiloxane, pressure-sensitive adhesive (Dow Corning XC–271) | 37.00 |
| Tetraethylene pentamine | 0.15 |
| Xylene solvent | 61.60 |
| Toluene solvent | 1.25 |

After drying the adhesive coat to remove the toluene and xylene solvents, the adhesive mass coat was cured for two minutes at 350° F. A test of the adhesive tape produced in accordance with this example showed that an average force of 80 ounces per inch width of tape was required to strip the adhesive from the backing while a corresponding unprimed sheet required an average removal force of 46 ounces per inch. In addition, the tape when wound upon itself in roll form was capable of being readily unwound without delamination of the backing or offset of the adhesive.

The following table will serve to illustrate the improved anchorage obtained with the primer compositions of this invention. For purposes of comparison, examples are given in which the fluorocarbon polymer backing surface has not been fluid-metal treated (Examples 19–21); other examples are given in which no primer is used (Examples 2, 10, 19); still other examples are given in which tetraethyl ortho-silicate (Example 8) or tetrabutyl ortho-titanate (Example 9) is the sole priming composition; another example is given in which tetrabutyl ortho-titanate (Example 10) is added to the pressure-sensitive silicone adhesive. In all examples, the sheets or tapes were prepared in accordance with the procedure described in Example 1, above, using the primer composition set forth in the table, below. Except for Example 10, the pressure-sensitive silicone adhesive composition employed was the same as that given in Example 1, above. The adhesive mass used in Example 10 comprised:

| | Parts by weight |
|---|---|
| Alkyl polysiloxane, silicone pressure-sensitive adhesive (Dow Corning XC–271) | 94.6 |
| Tetraethylene pentamine | 0.4 |
| Tetrabutyl ortho-titanate | 5.0 |
| Xylene | 157 |

The backing material used in Examples 2 through 18 was the same as that set forth in Example 1 above. In Examples 19–21, the backing material was a 2 mil thick nonfluid-metal treated extruded sintered polytetrafluoroethylene, "Teflon," film. Adhesive anchorage was measured by placing two strips of the adhesive tape, about 12 inches long, together adhesive to adhesive, rolling the laminate with a light roller to remove air bubbles, and then peeling them apart. The force required to peel the strips apart is measured in ounces per inch width. The values of adhesive anchorage recorded in the table are averages of two or more tests.

Table

| Example No. | Primer Composition (Figures given are parts by weight) | | Average Adhesive Anchorage |
|---|---|---|---|
| 2 | None | | 46 |
| 3 | Alkyl polysiloxane (Dow Corning XC-271) | 11.16 | 80 |
|   | Tetraethylene pentamine | 0.04 | |
|   | Tetraethyl ortho-silicate | 22.00 | |
|   | Xylene solvent | 20.00 | |
| 4 | Alkyl polysiloxane (Dow Corning XC-271) | 11.16 | 75 |
|   | Tetraethylene pentamine | 0.04 | |
|   | Tetraethyl ortho-silicate | 11.16 | |
|   | Xylene solvent | 20.00 | |
| 5 | Alkyl polysiloxane (Dow Corning XC-271) | 22.32 | 72 |
|   | Tetraethylene pentamine | 0.08 | |
|   | Tetraethyl ortho-silicate | 11.0 | |
|   | Xylene solvent | 40.00 | |
| 6 | Alkyl polysiloxane (Dow Corning XC-271) | 100.44 | 56 |
|   | Tetraethylene pentamine | 0.36 | |
|   | Tetraethyl ortho-silicate | 11.00 | |
|   | Xylene solvent | 180 | |
| 7 | Alkyl polysiloxane (Dow Corning XC-271) | 11.16 | 72 |
|   | Tetraethylene pentamine | 0.04 | |
|   | Tetraethyl ortho-silicate | 100.44 | |
|   | Xylene solvent | 20.0 | |
| 8 | Tetraethyl ortho-silicate | 100% | 36 |
| 9 | Tetrabutyl ortho-titanate | 100% | 48 |
| 10 | None | | 38 |
| 11 | Alkyl polysiloxane (Dow Corning XC-271) | 94.6 | 61 |
|   | Tetraethylene pentamine | 0.4 | |
|   | Tetrabutyl ortho-titanate | 5.0 | |
|   | Xylene solvent | 157 | |
| 12 | Alkyl polysiloxane (Dow Corning XC-271) | 84.66 | 72 |
|   | Tetraethylene pentamine | 0.34 | |
|   | Tetrabutyl ortho-titanate | 15.0 | |
|   | Xylene solvent | 140 | |
| 13 | Alkyl polysiloxane (Dow Corning XC-271) | 22.32 | 72 |
|   | Tetraethylene pentamine | 0.08 | |
|   | Tetrabutyl ortho-titanate | 11.0 | |
|   | Xylene solvent | 40.0 | |
| 14 | Alkyl polysiloxane (Dow Corning XC-271) | 11.16 | 72 |
|   | Tetraethylene pentamine | 0.04 | |
|   | Tetrabutyl ortho-titanate | 22.0 | |
|   | Xylene solvent | 20.0 | |
| 15 | Alkyl polysiloxane (Dow Corning XC-271) | 22.32 | 61 |
|   | Tetraethylene pentamine | 0.08 | |
|   | Tetra(2-ethylhexyl) ortho-titanate | 11.0 | |
|   | Xylene solvent | 40.0 | |
| 16 | Alkyl polysiloxane (Dow Corning XC-271) | 11.16 | 56 |
|   | Tetraethylene pentamine | 0.04 | |
|   | Tetra (2-ethylhexyl) ortho-titanate | 22.00 | |
|   | Xylene solvent | 20.00 | |
| 17 | Alkyl polysiloxane (Dow Corning XC-271) | 22.32 | 52 |
|   | Tetraethylene pentamine | 0.04 | |
|   | Tetra (octylglycolyl) ortho-titanate | 11.00 | |
|   | Xylene solvent | 40.00 | |
| 18 | Alkyl polysiloxane (Dow Corning XC-271) | 11.16 | 50 |
|   | Tetraethylene pentamine | 0.04 | |
|   | Tetra (octylglycolyl) ortho-titanate | 22.00 | |
|   | Xylene solvent | 20.00 | |
| 19 | None | | 13 |
| 20 | Alkyl polysiloxane (Dow Corning XC-271) | 11.16 | 18 |
|   | Tetraethylene pentamine | 0.04 | |
|   | Tetraethyl ortho-silicate | 22.0 | |
|   | Xylene solvent | 20.00 | |
| 21 | Alkyl polysiloxane (Dow Corning XC-271) | 11.16 | 8 |
|   | Tetraethylene pentamine | 0.04 | |
|   | Tetrabutyl ortho-titanate | 22.0 | |
|   | Xylene solvent | 20.0 | |

As seen from the foregoing table, improved anchorage between a fluid-metal activated fluorocarbon polymer surface and a pressure-sensitive silicone adhesive is obtained with the primer composition of this invention. Examples 9 and 10 establish that the primer composition should contain both a tetraalkyl ortho-silicate or a tetraalkyl ortho-titanate and a pressure-sensitive silicone adhesive to obtain improved adhesion. Example 10 illustrates that the tetraalkyl ortho-silicate or tetraalkyl ortho-titanate must be incorporated in a primer coating and is ineffectual if merely added to the pressure-sensitive adhesive mass coating. Examples 19–20 establish that it is essential to coat a fluid-metal activated surface of a fluorocarbon polymer surface backing element to obtain improved anchorage in accordance with this invention.

For a further description of the invention, reference is now made to the drawing which illustrates a vertical cross-sectional view of an improved normally tacky and pressure-sensitive tape produced in accordance with this invention. The tape comprises a backing 1 of a fluorocarbon polymer whose surface 2 has been treated with a fluid form of a metal, a primer composition 3 comprising a tetraalkyl ortho-silicate or a tetraalkyl ortho-titanate and a pressure-sensitive silicone adhesive, and an adhesive mass coating 4 of a normally tacky and pressure-sensitive silicone adhesive.

It is to be understood that various modifications may be made, for example, in materials or proportions or may occur to those skilled in the art to which this invention applies. Such modifications are within the scope and concept of the present invention.

What is claimed is:

1. An adhesive sheet comprising a fluorocarbon polymer backing material having a surface which has been activated with a fluid form of a metal, a primer coating on said activated surface comprising (a) from about 10 to 90 percent by weight of said primer coating of a material of the formula $M(OR)_4$ wherein M designates an element selected from the group consisting of silicon and titanium and wherein R designates a radical selected from the group consisting of alkyl and hydroxy-substituted alkyl radicals containing from about 1 to 12 carbon atoms, and (b) from about 90 to 10 percent by weight of said primer coating of a pressure-sensitive silicone adhesive, and an adhesive mass coating on said primer coating, said adhesive mass coating comprising a normally tacky and pressure-sensitive silicone adhesive.

2. An adhesive sheet as defined in claim 1 wherein said fluorocarbon polymer is polytetrafluoroethylene.

3. An adhesive sheet comprising a fluorocarbon polymer backing material having a surface which has been activated with a fluid form of a metal, a primer coating on said activated surface comprising from about 10 to 90 percent by weight of said primer coating of a tetraalkyl ortho-silicate wherein said alkyl group contains from about 1 to 12 carbon atoms and from about 90 to 10 percent by weight of said primer coating of a pressure-sensitive silicone adhesive, and an adhesive mass coating on said primer coating, said adhesive mass coating comprising a normally tacky and pressure-sensitive silicone adhesive.

4. An adhesive sheet as defined in claim 3 wherein said fluorocarbon polymer is polytetrafluoroethylene.

5. An adhesive sheet as defined in claim 3 wherein said tetraalkyl ortho-silicate is tetraethyl ortho-silicate.

6. An adhesive sheet comprising a fluorocarbon polymer backing material having a surface which has been activated with a fluid form of a metal, a primer coating on said activated surface comprising from about 10 to 90 percent by weight of said primer coating of a tetraalkyl ortho-titanate wherein said alkyl group contains from about 1 to 12 carbon atoms and from about 90 to 10 percent by weight of said primer coating of a pressure-sensitive silicone adhesive, and an adhesive mass coating on said primer coating, said adhesive mass coating comprising a normally tacky and pressure-sensitive silicone adhesive.

7. An adhesive sheet as defined in claim 6, wherein said fluorocarbon polymer is polytetrafluoroethylene.

8. An adhesive sheet as defined in claim 6, wherein said tetraalkyl ortho-titanate is tetrabutyl ortho-titanate.

9. An adhesive sheet as defined in claim 6, wherein said tetraalkyl ortho-titanate is tetra (2-ethyl hexyl) ortho-titanate.

10. An adhesive sheet as defined in claim 1 wherein said material represented by said formula $M(OR)_4$ is tetra (octyl glycolyl) ortho-titanate.

(References on following page)

References Cited in the file of this patent

UNITED STATES PATENTS

| | | |
|---|---|---|
| 2,705,691 | Panagrossi et al. | Apr. 5, 1955 |
| 2,727,876 | Iler | Dec. 20, 1955 |
| 2,736,721 | Dexter | Feb. 28, 1956 |
| 2,744,878 | Johannsen | May 8, 1956 |
| 2,751,314 | Keil | June 19, 1956 |
| 2,777,827 | Doede et al. | Jan. 15, 1957 |
| 2,789,063 | Purvis et al. | Apr. 16, 1957 |
| 2,824,026 | Homeyer et al. | Feb. 18, 1958 |